No. 707,528. Patented Aug. 19, 1902.
J. WOLFINGER.
CHEESE MARKER.
(Application filed June 2, 1902.)
(No Model.)
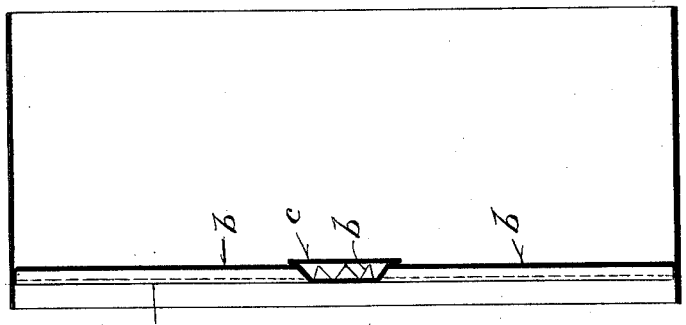
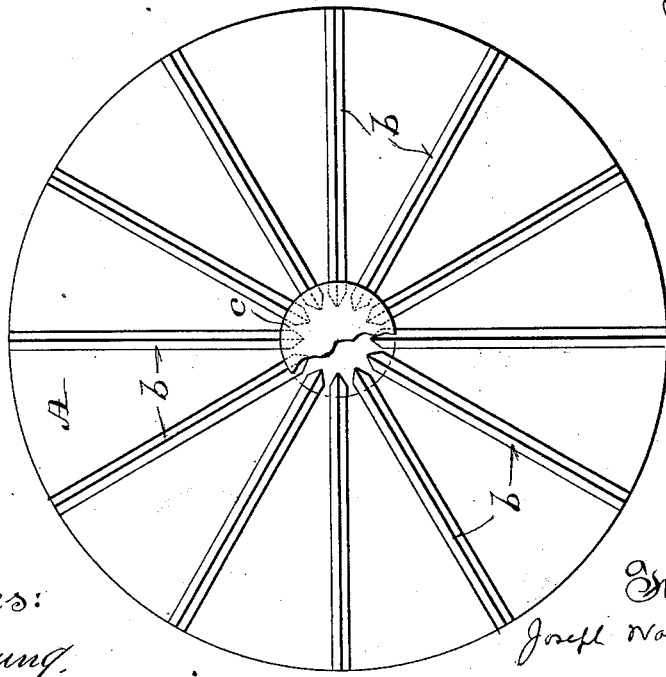
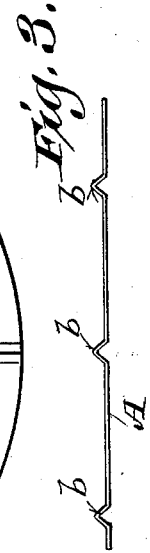
Witnesses:
Geo. W. Young.
N. E. Oliphant.
Inventor:
Joseph Wolfinger
By H. G. Underwood
Attorney

UNITED STATES PATENT OFFICE.

JOSEPH WOLFINGER, OF DUNDAS, WISCONSIN.

CHEESE-MARKER.

SPECIFICATION forming part of Letters Patent No. 707,528, dated August 19, 1902.

Application filed June 2, 1902. Serial No. 109,842. (No model.)

*To all whom it may concern:*

Be it known that I, JOSEPH WOLFINGER, a citizen of the United States, and a resident of Dundas, in the county of Calumet and State of Wisconsin, have invented certain new and useful Improvements in Cheese-Makers' Appliances; and I do hereby declare that the following is a full, clear, and exact description thereof.

My invention has for its object to provide for ventilation of cheeses standing on shelves or packed in boxes and at the same time to mark said cheeses to designate equal divisions of the same, said invention consisting in plates of peculiar construction designed for utilization as cheese-hoop bottoms or follow-boards in cheese-presses or on flat surfaces of cheeses out of hoop, said plates being hereinafter particularly set forth with reference to the accompanying drawings and subsequently claimed.

Figure 1 of the drawings represents a plan view of a cheese-indenting plate in accordance with my invention, partly broken; Fig. 2, a section view of a cheese-hoop and an indenting-plate therein, and Fig. 3 an edge view of a fragment of said plate.

Referring by letter to the drawings, A indicates a circular plate one face of which is provided at regular intervals with radial, preferably triangular, ridges $b$, the converging, preferably pointed, inner ends of which are covered by a center disk $c$ and out of touch one with another, the disk being soldered or otherwise suitably secured in place.

The above-described ridged plate and disk therewith are of any suitable material, preferably metal, cast or stamped and constitute a cheese-hoop bottom or a follow-board in a cheese-press, or the device may be applied under pressure to an end of a cheese out of hoop. In either case the opposing end of the cheese is indented by the plate-ridges $b$ and center disk $c$ to form radial furrows in communication with a central recess, whereby when the plate is removed and said cheese stood on end upon a shelf or packed in a box there is circulation of air between it and the surface in contact with either or both of the indented extremities to prevent molding, while at the same time the aforesaid cheese is marked off by the end furrows thereof at regular intervals to gage its cutting into equal parts.

Having thus described my invention, what I claim as new, and desire to secure by Letters Patent, is—

A cheese-marker consisting of a circular plate having one face thereof provided at regular intervals with radial ridges out of touch with one another at their inner ends, and a center disk covering said inner ends of the plate-ridges.

In testimony that I claim the foregoing I have hereunto set my hand, at Dundas, in the county of Calumet and State of Wisconsin, in the presence of two witnesses.

JOSEPH WOLFINGER.

Witnesses:
    FRANK F. BECKER,
    GEO. E. DAWSON.